US011105750B2

(12) United States Patent
 Micheli

(10) Patent No.: US 11,105,750 B2
(45) Date of Patent: Aug. 31, 2021

(54) METHOD AND SYSTEM FOR THE AUTOMATIC MEASURING OF PHYSICAL AND DIMENSIONAL PARAMETERS OF MULTI-SEGMENT ARTICLES

(71) Applicant: XEPICS SA, Lugano (CH)

(72) Inventor: Nicola Micheli, Como (IT)

(*) Notice: Subject to any disclaimer, the term of this patent is extended or adjusted under 35 U.S.C. 154(b) by 105 days.

(21) Appl. No.: 16/683,860

(22) Filed: Nov. 14, 2019

(65) Prior Publication Data

US 2020/0158658 A1 May 21, 2020

(30) Foreign Application Priority Data

Nov. 15, 2018 (IT) .................. 102018000010374

(51) Int. Cl.

| G01N 21/88 | (2006.01) |
|---|---|
| G06T 7/62 | (2017.01) |
| G01N 21/952 | (2006.01) |
| G06T 5/00 | (2006.01) |
| G06T 7/00 | (2017.01) |
| H04N 5/225 | (2006.01) |

(52) U.S. Cl.
CPC ....... *G01N 21/8851* (2013.01); *G01N 21/952* (2013.01); *G06T 5/006* (2013.01); *G06T 7/0004* (2013.01); *G06T 7/62* (2017.01); *H04N 5/2256* (2013.01); *G01N 2021/8887* (2013.01); *G06T 2207/20212* (2013.01)

(58) Field of Classification Search
CPC ............. G01N 21/8851; G01N 21/952; G01N 2021/8887; G06T 7/62; G06T 5/006; G06T 7/0004; G06T 2207/20212; H04N 5/2256; G01B 11/04; A24C 5/3412
See application file for complete search history.

(56) References Cited

U.S. PATENT DOCUMENTS

| 4,277,678 A | 7/1981 | Wahle et al. |
|---|---|---|
| 4,377,743 A * | 3/1983 | Bolt .................. A24C 5/3412 209/536 |
| 4,511,045 A * | 4/1985 | Seragnoli ........... A24C 5/3412 209/535 |
| 4,644,176 A | 2/1987 | Heitmann et al. |
| 4,767,924 A | 8/1988 | Giebel et al. |

(Continued)

FOREIGN PATENT DOCUMENTS

WO 2017/221126 A2 12/2017

OTHER PUBLICATIONS

Search Report and Written Opinion from Italian Priority Application No. 102018000010374; dated Oct. 9, 2019.

*Primary Examiner* — Xuemei G Chen
(74) *Attorney, Agent, or Firm* — Egbert, McDaniel & Swartz, PLLC

(57) ABSTRACT

A measuring system for measuring and detecting physical and dimensional parameters of multi-segment rod-like articles, includes: a first lighting device that generates a light beam that strikes and crosses a front segment; a second lighting device that generates a light beam that strikes and crosses a back segment; an image detection sensor having a detection axis that radially strikes a longitudinal axis of the article; and a control and processing unit configured in such a way to process the images acquired by the image detection sensor and calculate dimensional, geometrical and physical features of the segments of said article.

12 Claims, 6 Drawing Sheets

(56) References Cited

U.S. PATENT DOCUMENTS

| | | | | |
|---|---|---|---|---|
| 4,907,607 | A | | 3/1990 | Focke et al. |
| 5,228,462 | A | * | 7/1993 | Osmalov .............. A24C 5/3412 131/280 |
| 5,569,931 | A | * | 10/1996 | Ghini .................. A24C 5/3412 250/559.4 |
| 8,306,308 | B2 | * | 11/2012 | Choi .................... G06T 7/0004 382/141 |
| 8,979,401 | B2 | * | 3/2015 | Thursby ............. G02B 23/2461 396/448 |
| 10,508,995 | B2 | * | 12/2019 | Mayumi ............ G01N 21/8851 |
| 2003/0102001 | A1 | * | 6/2003 | Suzuki ..................... G01N 9/24 131/280 |
| 2006/0002605 | A1 | * | 1/2006 | Chang .................. G01N 21/952 382/141 |
| 2006/0119864 | A1 | * | 6/2006 | Lindner ............... G01N 21/952 356/606 |
| 2006/0180167 | A1 | * | 8/2006 | Spatafora ................ B65B 19/32 131/280 |
| 2009/0194118 | A1 | * | 8/2009 | Ademe ................ A24D 3/0216 131/346 |
| 2014/0132793 | A1 | * | 5/2014 | Chang .................. H04N 5/2256 348/222.1 |
| 2017/0160079 | A1 | * | 6/2017 | Takebuchi ............. G01N 21/95 |
| 2018/0328723 | A1 | * | 11/2018 | Casagrande ....... G01B 11/2408 |
| 2018/0332888 | A1 | * | 11/2018 | Casagrande ......... G01B 11/245 |
| 2018/0357755 | A1 | * | 12/2018 | Seo .................. G01N 21/95684 |
| 2019/0257692 | A1 | * | 8/2019 | Cochran ................... G06T 7/73 |
| 2020/0064278 | A1 | * | 2/2020 | Safai .................. G01N 21/8806 |
| 2020/0236987 | A1 | * | 7/2020 | Casagrande ............ B65B 19/28 |
| 2020/0358935 | A1 | * | 11/2020 | Sasa ......................... H04N 7/18 |
| 2020/0375241 | A1 | * | 12/2020 | Whiffen ................... G01N 9/24 |

\* cited by examiner

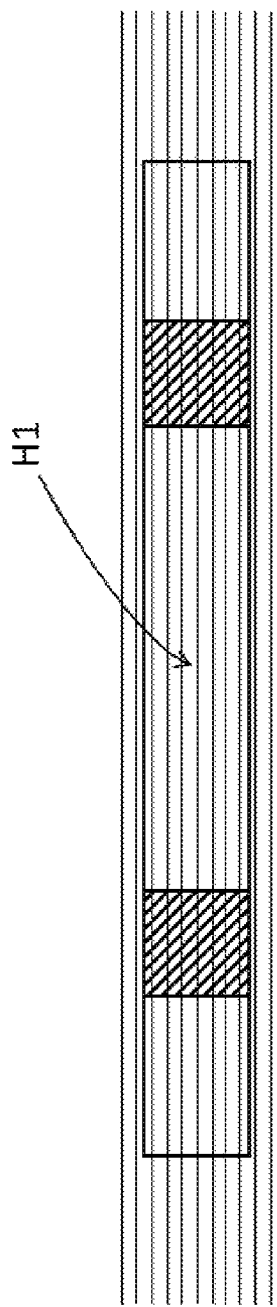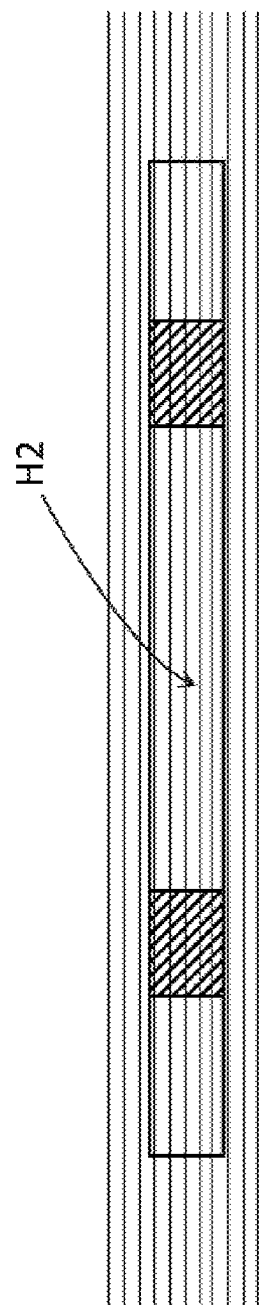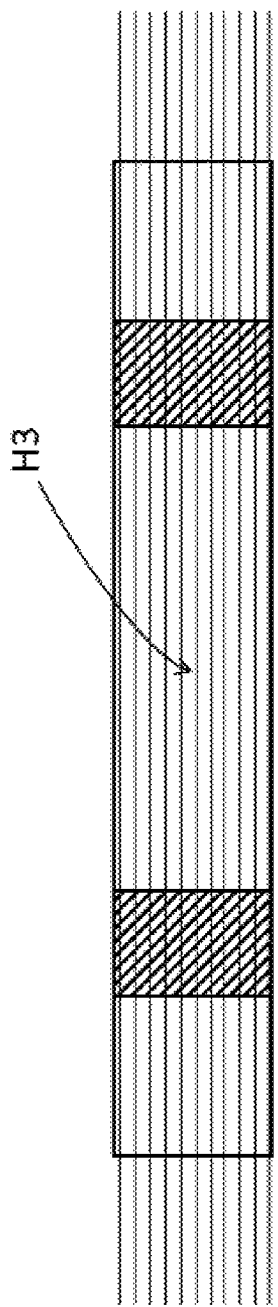

METHOD AND SYSTEM FOR THE AUTOMATIC MEASURING OF PHYSICAL AND DIMENSIONAL PARAMETERS OF MULTI-SEGMENT ARTICLES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present patent application for industrial invention relates to a system (100) for measuring and detecting the physical and dimensional parameters of multi-segment rod-like articles, wherein the segments disposed at the ends of the article are not completely opaque to a light beam. Such an article comprises at least two adjacent segments, which can also be the two end segments. The two adjacent segments have a different opacity to the luminous radiation. In such a way, an interface is generated between the two adjacent segments with an opacity variation. The present invention also relates to a method for measuring said physical and dimensional characteristics of the articles.

In particular, the field of reference is the quantitative and qualitative analysis of cigarettes and/or filters.

2. Description of Related Art Including Information Disclosed Under 37 CFR 1.97 and 37 CFR 1.98

Combined articles comprising multiple segments with cylindrical shape, such as for example cigarettes and/or filters, are commonly defined as "multi-segment rod-like articles" in the tobacco industry.

In particular, the present invention relates to semi-finished products of the tobacco industry, such as for example multi-segment filters, filters with additional components, cigarettes, multi-segment cigarettes with reduced tobacco and the like. In any case, the end segments (the so-called front segment and back segment) of said articles must be made of a material that is not-completely opaque to the luminous radiation, and there must be at least two adjacent segments with different opacity to the luminous radiation.

After being produced, the multi-segment rod-like articles undergo quality and conformity checks in such a way to be suitable for being introduced in the market.

Such quality checks consist in the analysis of geometrical parameters, such as for example the length of the individual segments, the length of the article, the diameter of the article, the dimensions of the components inserted in the segments of the multi-segment article, the position of said additional components, etc. in order to check the product conformity.

According to the prior art, the detection of the geometrical parameters is based on the way in which the segments of a multi-segment article or the different elements of the multi-segment article respond to the luminous radiation.

In particular, a consolidated technology for the analysis of these articles is based on the transmission of a luminous radiation through the multi-segment article. Such a method consists in lighting a multi-segment rod-like article by means of a light source disposed in opposite position relative to a detector (photodiodes or a camera). In such a way, the luminous radiation is projected on the detector and crosses the article, showing the different segments and the additional components, if any, in the image.

Such a technology is impaired by drawbacks related with special configurations in the combination of the article. If extremely short, non-completely opaque segments are combined, the luminous radiation transmitted through the segments is not sufficient to identify a clear distinction between segments with different opacity in the image. In fact, the contrast is not sufficient and accurate measurements are not possible.

Consequently, no processing can be made to extrapolate accurate quantitative dimensional data and information on the elements of said multi-segment rod-like article. In particular, the low contrast between the different segments generates an uncertainty error on the measurement of the exact position of the borders of each segment, thus causing the intrinsic inaccuracy of the measures of the segments of the multi-segment rod-like article.

Another drawback consists in the fact that the lighting of the multi-segment rod-like article is not homogeneous. More precisely, the lighting is higher in the lighting center and is attenuated when moving away from the lighting center.

Such a lack of uniformity results in a different accuracy for segments that are disposed in the center of the multi-segment rod-like article and for the segments that are disposed at the ends of said multi-segment rod-like article.

Because of the aforementioned problems, when inspected with a measurement system according to the prior art, the multi-segment rod-like articles are measured and checked in an inaccurate way.

BRIEF SUMMARY OF THE INVENTION

The purpose of the present invention is to overcome the drawbacks of the prior art by devising a measuring system that is capable of generating a high-resolution image with a high-contrast of the interfaces between the end segments that are made of a non-completely opaque material and the intermediate segments that are made of a material with a different opacity to luminous radiation compared to the opacity of the end segments.

An additional purpose of the present invention is to disclose an automatic measuring system, wherein the detected image is not unfocused in the interfaces between the end segments and the intermediate segments in adjacent position to the end segments, in such a way to extract extremely accurate quantitative parameters, minimizing uncertainty errors.

Another purpose of the present invention is to disclose an automatic measuring system, wherein the lighting of the multi-segment rod-like article is uniform along the entire length of the article.

Another purpose is to disclose a method for measuring dimensional, geometrical and physical parameters of the article and of the elements of the multi-segment rod-like article.

These purposes are achieved according to the invention with the characteristics of the appended independent claim 1.

Advantageous embodiments appear from the dependent claims.

The measuring system of the invention is defined by claim 1.

BRIEF DESCRIPTION OF THE SEVERAL VIEWS OF THE DRAWINGS

For the sake of clarity, the description of the measuring system according to the invention continues with reference to the attached drawings, which have a merely illustrative, not limiting value, wherein:

FIG. 3A is a general view of a multi-segment rod-like article, wherein the article has crossed the detection axis at a preset speed;

FIG. 3B is a general view of a multi-segment rod-like article, wherein the article has crossed the detection axis at a higher speed than the preset speed;

FIG. 3C is a general view of a multi-segment rod-like article, wherein the article has crossed the detection axis at a lower speed than the preset speed;

DETAILED DESCRIPTION OF THE INVENTION

Figure 1:
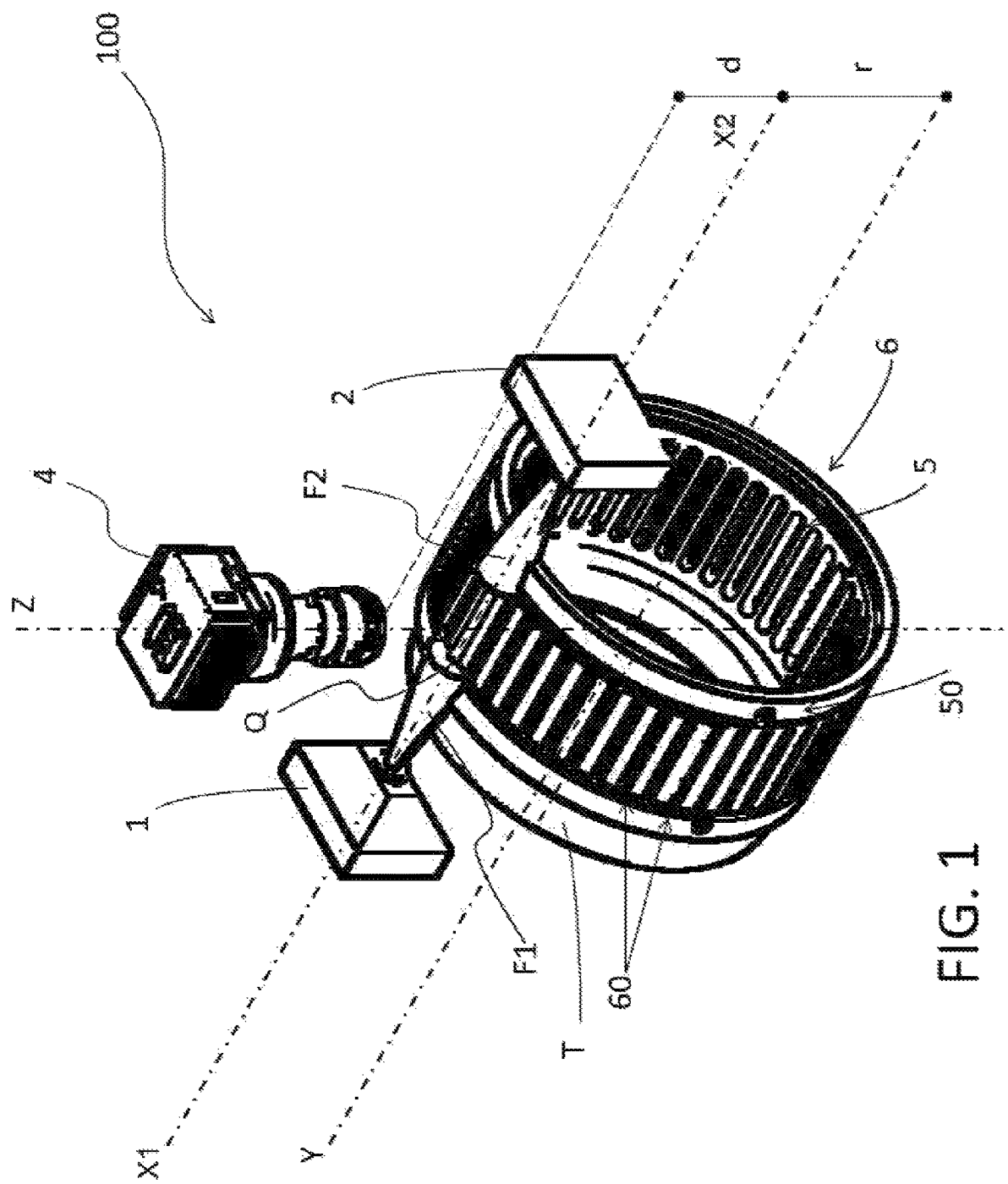
FIG. 1 is an axonometric view of the measuring system of the invention according to a first embodiment.
Figure 2:
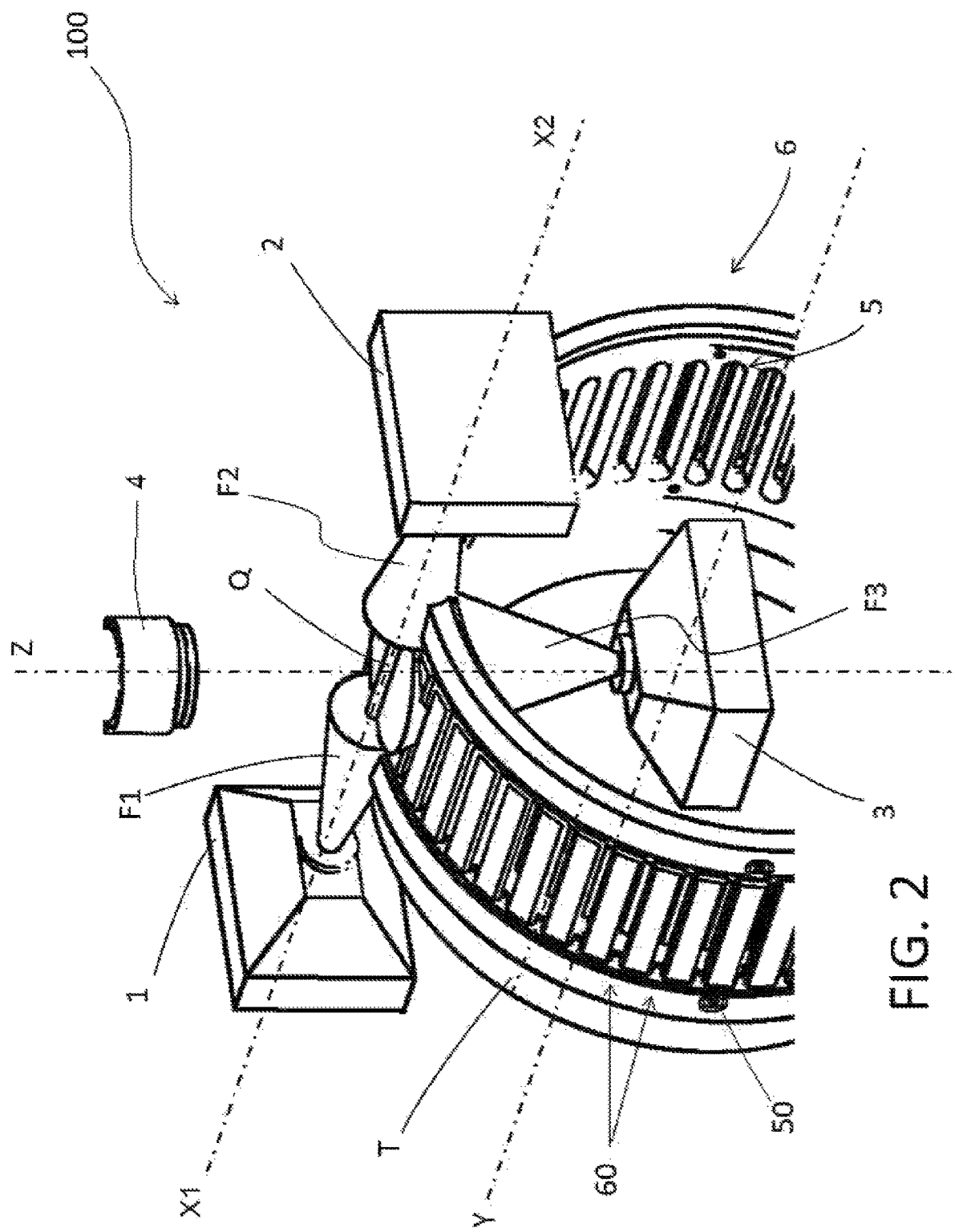
FIG. 2 is a partial axonometric view of the measuring system of the invention according to a second embodiment.

With reference to FIGS. 1 and 2, a measuring system for a multi-segment rod-like article according to the invention is disclosed, which is generally indicated with reference numeral 100.

The measuring system (100) has been devised to measure geometrical, dimensional and physical parameters of at least one multi-segment rod-like article, which is indicated with letter Q and of the segments of said article (Q).

Figure 3:
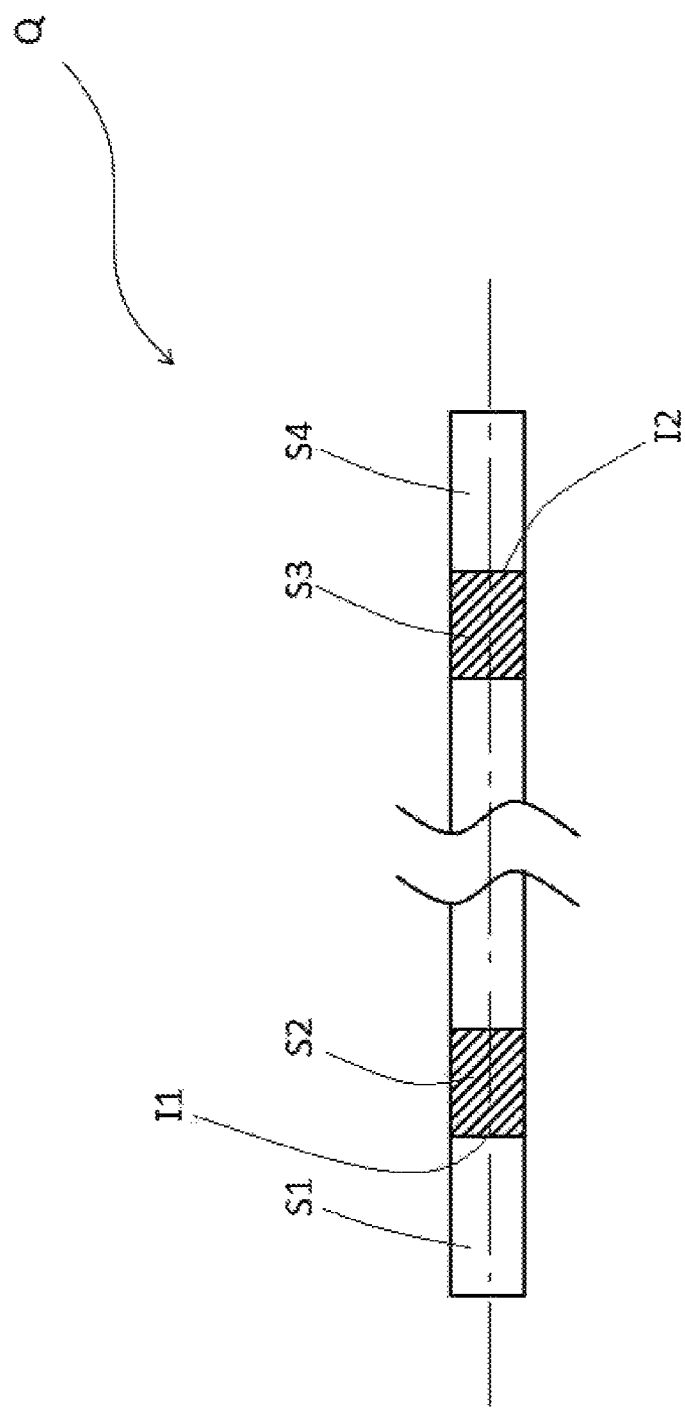
FIG. 3 is an illustrative view of a multi-segment rod-like article.

With reference to FIG. 3, the article (Q) has a substantially cylindrical shape and a longitudinal axis (X).

The article (Q) must necessarily have two end segments: a front segment (S1) and a back segment (S4). The front segment (S1) and the back segment (S4) are made of a material that is non-completely opaque to luminous radiation.

The article must have at least two adjacent segments, which can be the front segment (S1) and the back segment (S4). The two adjacent segments are made of materials with a different opacity, in such a way to generate an interface with an opacity variation.

In the example of FIG. 3, the front segment (S1) is adjacent to a first intermediate segment (S2) made of a material with a different opacity to luminous radiation compared to the opacity of the material of the front segment. An interface (I1) is disposed between the front segment (S1) and the intermediate segment (S2).

The back segment (S4) is adjacent to a last intermediate segment (S3) made of a material with a different opacity to luminous radiation compared to the opacity of the material of the back segment (S4). An interface (I2) is disposed between the back segment (S4) and the intermediate segment (S3).

The article (Q) can be a cigarette and/or a cigarette filter.

The measuring system (100) comprises a first lighting device (1) and a second lighting device (2) disposed in opposite position.

Each lighting device comprises a lighting axis (X1, X2). The lighting axes (X1, X2) of the first lighting device and of the second lighting device (1, 2) are aligned in such a way that each lighting device (1, 2) generates a light beam (F1, F2) opposite to the other lighting device (1, 2). The article (Q) is disposed in such a way that the longitudinal axis (X) of the article (Q) coincides with the lighting axes (X1, X2).

Because of such an arrangement of the two lighting devices (1, 2), the luminous radiation can cross the front segment (S1) and the back segment (S4) of the article (Q) until it reaches the interface or the interfaces (I, I2) of the front segment (S1) and of the back segment (S4).

Going along the lighting axis (X) from the first lighting device (1) towards the second lighting device (2), the attenuation of the light beam (F1) generated by the first lighting device (1) is compensated by the intensification of the light beam (F2) generated by the second lighting device (2).

With reference to FIGS. 1 and 2, the first lighting device and the second lighting device (1, 2) have the same distance relative to a median point of the article (Q).

With reference to FIG. 1, the measuring system (100) comprises an image detection sensor (4). The image detection sensor (4) has a detection axis (Z).

The image detection sensor (4) is disposed in such a way that the detection axis (Z) strikes radially the longitudinal axis (X) of the article (Q) that coincides with the lighting axes (X1, X2).

The image detection sensor (4) is suitable for acquiring a set of images of the article (Q). Preferably, the image detection sensor (4) is a linear camera. Said linear camera provides for the acquisition of a set of linear images (image lines) over time, which are all aligned with the longitudinal axis (X) of the article (Q) that coincides with the lighting axes (X1, X2) and are centered on the incidence point where the detection axis (Z) radially strikes the article (Q).

Figure 4:
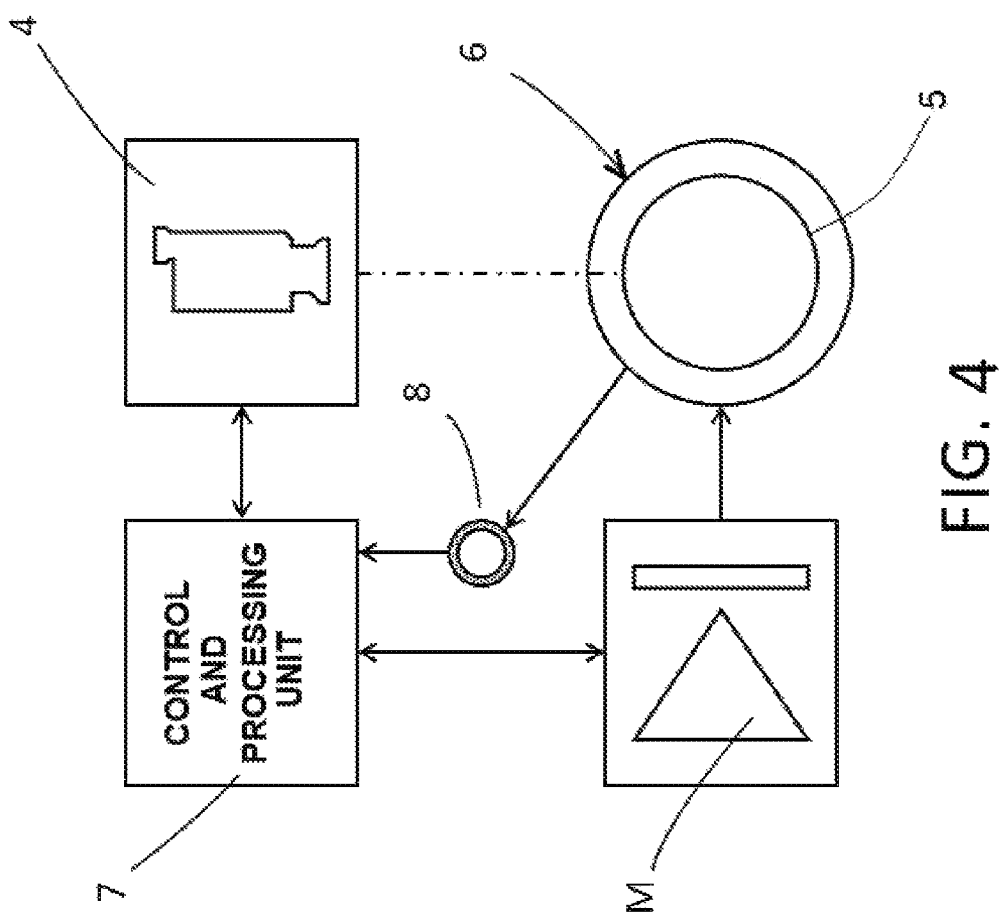
FIG. 4 is a block diagram that shows a check of the measuring system according to the invention.

With reference to FIG. 4, the measuring system (100) comprises a control and processing unit (7) that is electrically connected to the image detection sensor (4).

Moreover, the control and processing unit (7) receives and processes the images from the image detection sensor (4).

Furthermore, the control and processing unit (7) is configured in such a way to generate a rejection signal based on the image processing. The rejection signal is of "good/no good" type and is generated by the control and processing unit (7) by comparing the measurements with the validity parameters of the article (Q) and/or of one or more sections of said article (Q). The control and processing unit (7) compares the measurements made on each article (Q) and/or on each section of the article (Q) with a set of parameters that are set by the user and refer to the specifications of the article.

If the result of the comparison between the measurements made by the control and processing unit (7) and the specifications is positive, the rejection signal will be of "good" type and the article (Q) can be considered to comply with the specifications. Otherwise, if the result of the comparison between the measurements made by the control and processing unit (7) and the specifications is negative, the rejection signal will be of "no-good" type and the article (Q) is to be considered not to comply with the specifications.

The measuring system (100) provides a detailed analysis of the article (Q), both qualitatively and quantitatively.

In particular, because of the fact that the two lighting devices (1, 2) are disposed one in front of the other, with lighting axis (X1, X2) that coincides with the longitudinal axis (X) of the article (Q), the measuring system (100) lets the light beams (F1, F2) penetrate in the front segment (S1) and in the back segment (S4) of the article (Q), highlighting the contrast in the interfaces (I1, I2) with the intermediate segments (S2, S3).

Moreover, by axially crossing the article (Q), the light beams (F1, F2) highlight the geometrical properties of the additional components that may be disposed in the article (Q).

Furthermore, because of the fact that the image detector sensor (4) is a linear camera, the linear images that are detected are focused in correspondence of the lighting axes (X1, X2), where the lighting is maximum and uniform.

Therefore, the measuring system (100) permits to scan (100) scans every article (Q) that crosses the detection axis (Z).

With reference to FIG. 1, the measuring system (100) may comprise a conveyor device (6). The conveyor device (6) comprises a plurality of housings (60) that are suitably configured to house said articles (Q).

Advantageously, the conveyor device (6) is a drum conveyor device, but it can also be an ordinary linear conveyor device, such as for example a ribbon or chain conveyor device.

The conveyor device (6) comprises a drum (5) with a cylindrical lateral surface (50), where said plurality of housings (60) is obtained. The cylindrical surface (50) of the drum (5) has a radius (r). The drum (5) has an axis of rotation (Y).

With reference to FIG. 4, the measuring system (100) comprises moving means (M) to move the conveyor device (6). In particular, according to the embodiment of the invention shown in FIGS. 1 and 2, the moving means (M) are suitable for rotating the drum (5) at a preset rotation speed. For illustrative purposes, the moving means (M) may comprise an electrical motor comprising a drive shaft where the drum (5) is directly coupled (direct drive). Alternatively, drive means are provided to connect the drive shaft to the drum (5).

The axis of rotation (Y) of the drum is parallel to the lighting axes (X1, X2) and orthogonal to the detection axis (Z). The detection axis (Z) radially strikes the cylindrical lateral surface (50).

The image acquisition frequency can be either fixed or controlled by means of a synchronization device between the conveyor device (6) and the image detection sensor (4). In case of synchronization, the measuring system (100) comprises speed detection means suitable for detecting the speed of the conveyor device (6).

The image detector sensor (4) is disposed at a distance (d) from said axis of rotation (Y) of the drum (5) that is higher than the radius (r) of the cylindrical lateral surface (50). Therefore, said image detector sensor (4) is disposed outside said drum (5).

With reference to FIG. 1, each housing (60) of the conveyor device is a slot obtained in the cylindrical lateral surface (50) of the drum. Said slot is suitably configured to firmly house said article (Q).

Each housing (60) comprises a longitudinal axis (T) that is parallel to said lighting axes (X1, X2). The longitudinal axis (T) of the housing coincides with the longitudinal axis (X) of the article (Q) when the article is disposed in the housing (60).

With reference to FIG. 1, the lighting axes (X1, X2) are directed in such a way that during the rotation of the drum (5), every time a housing (60) crosses the detection axis (Z) of the image detection sensor (4), the longitudinal axis (T) of the housing (60) coincides with said lighting axes (X1, X2).

With reference to FIG. 4, the measuring system (100) comprises speed detection means (8) suitable for detecting the speed of the conveyor device (6). In such a case, the control and processing unit (7) is electrically connected to the speed detection means (4), to the moving means (M) and to the image detection sensor (4).

If the conveyor device comprises a rotating drum, the speed detection means (8) can be an encoder suitable for counting the number of drum revolutions in the time unit.

The control and processing unit (7) receives the speed of the conveyor device (6) from the speed detection means (8). The control and processing unit (7) is configured in such a way to control:
  the moving means (M) to check the speed of the conveyor device (6), and
  the image detection sensor (4) to check the image acquisition frequency of the image detection sensor (4).

Preferably, said moving means (M) move the drum (5) in such a way that the detection axis (Z) is crossed, for example, by 35 articles per second.

The image detection sensor (4) can have a preset acquisition frequency of 60.000 Hz. Alternatively, the image acquisition frequency of the image detection sensor (4) may be synchronized with the speed of the conveyor device (6). For such a synchronization, the speed detection means (8) and the control and processing unit (7) are used.

By precisely knowing both the image acquisition frequency of the image detection sensor (4) and the rotation of the drum (5), and consequently the speed of an article (Q) when crossing the detection axis (Z), a total image (H1, H2, H3) of an article (Q) can be reconstructed from the image lines acquired by the image detection sensor (4) (FIG. 3A, 3B, 3C).

Because of mechanical imperfections, the drum (5) may accelerate or decelerate, increasing or decreasing the speed of an article (Q) when crossing the detection axis (Z). When the image acquisition frequency of the image detection sensor (4) is constant, a variation of the speed of the article (Q) when crossing the detection axis (Z) results in a distortion of the total image (H1, H2, H3) of the article (Q) with consequent evaluation and measurement errors.

In particular, with reference to FIGS. 3A, 3B and 3C, if the image acquisition frequency is constant, in case of acceleration of the conveyor device (6), the image lines acquired for each article (Q) decrease, thus obtaining a total image (H2) of the article (Q) with lower dimensions than the total image (H1) of the real article (Q) (which would be obtained if the conveyor device (6) had a constant speed equal to the preset value); whereas, in case of deceleration of the conveyor device (6), the image lines acquired for each article (Q) increase, thus obtaining a total image (H3) of the article (Q) with higher dimensions than the total image (H1) of the real article (Q) (FIG. 3A).

The control and processing unit (7) is configured in such a way to compensate the accelerations/decelerations of the conveyor belt (6) by means of an external synchronization system that uses the speed detection means (8).

If the image acquisition frequency is preset, the control and processing unit (7) can use a suitable reconstruction algorithm, so that the dimensions of the total image (H1) of the article (Q) correspond to the real dimensions of the article (Q).

Additionally, said control and processing unit (7) is configured in such a way to process the reconstructed compensated image. More precisely, the control and processing unit is configured in such a way to segment the image and/or detect the interfaces (I1, I2) between the segments of the article (Q), in such a way to obtain geometrical and dimensional features of the segments of said multi-segment rod-like article (Q).

With reference to FIG. 2, the measuring system (100) can be also provided with a third lighting device (3) that is provided with a lighting axis that is aligned with the detection axis (Z) and generates a light beam (F3) towards said image detection sensor (4).

The distance of the third lighting device (3) relative to the axis of rotation (Y) of the drum (5) is lower than the radius (r) of the cylindrical lateral surface (50), and consequently the third lighting device (3) is disposed inside said drum (5) and the cylindrical lateral surface (50) is disposed between said third lighting device (3) and said image detection sensor (4).

The third lighting device (3) increases the contrast between the segments of the article (Q) that may be disposed between segments that are completely opaque to the luminous radiation, providing additional indications on the composition of the article (Q).

Figure 5:
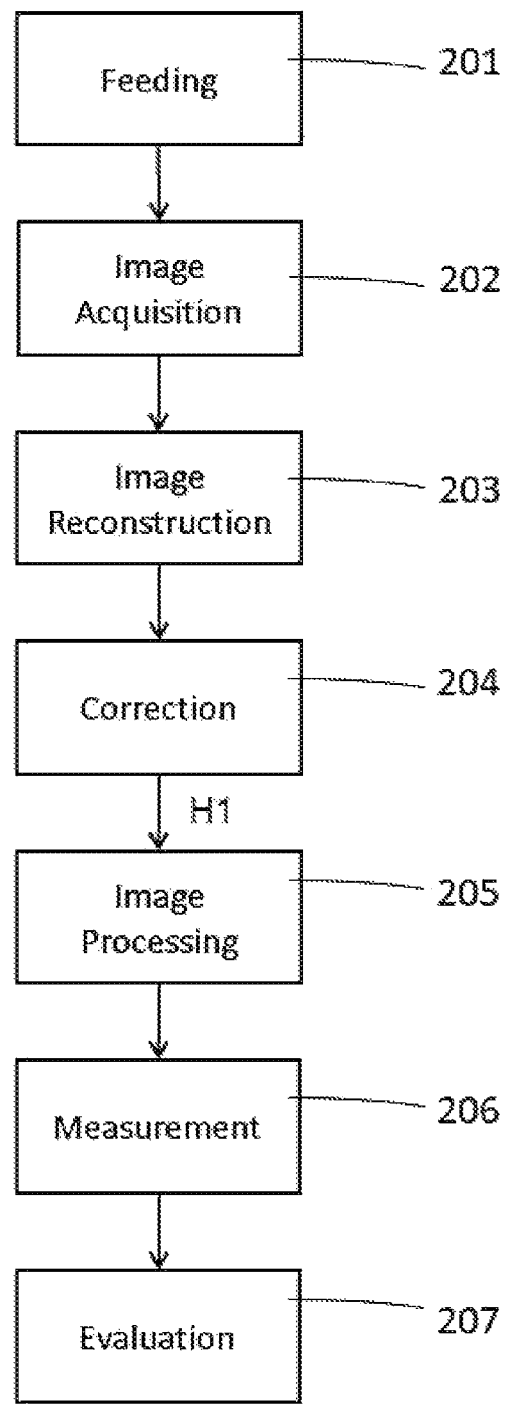
FIG. 5 is a flow diagram that shows the operation of the measuring system according to the invention.

With reference to FIG. 5, a method for measuring the geometrical and dimensional parameters of an article (Q) and of its segments with the measuring system (100) of the invention is disclosed.

The method comprises a feeding step (201) wherein the articles (Q) disposed on the conveyor device (6) are continuously fed towards said image detection sensor (4).

The feeding step (201) is a continuous process that is performed while the conveyor device (6) is moved. The articles (Q) can be disposed in housings (60) of the conveyor device (6) by means of additional feeding drums (not shown) that release one single article (Q) for each housing (60) of the conveyor device (6).

If the conveyor device (6) is a drum conveyor, by rotating, the drum (5) transports the articles (Q), one by one, through the detection axis (Z) of the image detection sensor (4).

When an article crosses the detection axis (Z) of the image detection sensor (4), the image detection sensor (4) performs an acquisition step (202) wherein a set of images of the article (Q) is detected and sent to the control and processing unit (7).

After receiving the set of images, the control and processing unit (7) performs an image reconstruction step (203) wherein a total image (H1, H2, H3) of the item (Q) is reconstructed.

After reconstructing the total image (H1, H2, H3), the control and processing unit (7) performs a correction step (204), wherein the distortion of the total image (H1, H2, H3) is compensated, if any.

The outcome of the correction step (204) is a high-definition total image (H1) of the article (Q) that allows the system to make accurate measurements on the article (Q) and on its segments.

In order to obtain the measures, the control and processing unit (7) performs a processing step (205) on the total image (H1) of the article (Q). Image processing algorithms, such as border segmentation and extraction algorithms, are used during the processing step. The corrected total image (H1) is segmented in such a way to detect the interfaces (I1, I2) between adjacent segments.

After extracting the interfaces (IL 12) of the adjacent segments, the control and processing unit (7) performs a measurement step (206) wherein the dimensional and physical parameters are calculated, in such a way to have quantitative and qualitative information on the article (Q).

Based on the measures, the control and processing unit (7) informs an evaluation (207) of the conformity of the measured article (Q) by means of a rejection signal, by comparing the measures made on the article (Q) and/or on its segments with the specifications set by the user. According to the rejection signal, the article (Q) may be rejected or not from production.

After the description of the measuring system (100) and of the method used for calculating the dimensional and geometrical parameters of an article (Q) and of its segments, it appears evident that the arrangement of two lighting devices (1, 2) in opposite position, one facing the other, permits to define the interfaces (I1 I2) between adjacent segments with different opacity by means of the control and processing unit (7) and of the border segmentation and detection algorithms. The interfaces (I1 12) are used to extrapolate extremely accurate dimensional, geometrical and physical parameters that permit to evaluate the conformity of the article (Q).

Numerous variations and modifications can be made to the present embodiment of the invention, which are within the reach of an expert of the field, falling in any case within the scope of the invention as disclosed by the appended claims.

I claim:

1. Measuring system for measuring and detecting physical and dimensional parameters of multi-segment rod-like articles, wherein each article has a longitudinal axis and comprises a front segment and a back segment of non-completely opaque material and two adjacent segments with different opacity, in such a way to generate an interface between the two adjacent segments;

said measuring system comprising:
   a first lighting device that generates a light beam that strikes and crosses the front segment, wherein the lighting axis of the light beam of the first lighting device coincides with the longitudinal axis of the article;
   a second lighting device that generates a light beam that strikes and crosses the back segment, wherein the lighting axis of the light beam of the second lighting device coincides with the longitudinal axis of the article;
   an image detection sensor comprising a detection axis that radially strikes the longitudinal axis of the article; said image detection sensor being suitable for acquiring a set of images of the article;
   a control and processing unit configured in such a way to process the images acquired by the image detection sensor and calculate dimensional, geometrical and physical features of the segments of said article.

2. The measuring system of claim 1, further comprising:
   a conveyor device comprising at least one housing to house at least one article; and
   moving means to move said conveyor device (6);
   wherein said control and processing unit is configured in such a way to control the moving means of the conveyor device and/or the image acquisition frequency of the image detection sensor.

3. The measuring system of claim 2, wherein said conveyor device comprises a drum with a cylindrical lateral surface, whereon said at least one housing is obtained.

4. The measuring system of claim 3, wherein the axis of rotation of said drum is parallel to the lighting axes of said first and second lighting device.

5. The measuring system of claim 3, wherein said first and said second lighting device have the same distance relative to a plane passing through the detection axis of the image detection sensor and orthogonal to said lighting axes of said first and second lighting device.

6. The measuring system of claim 3, wherein said cylindrical lateral surface of the drum has a radius; said image detection sensor being disposed at a distance from said axis of rotation of the drum that is higher than the radius of the cylindrical lateral surface.

7. The measuring system of claim 1, comprising a third lighting device facing said image detection sensor; said third lighting device comprising a lighting axis that is aligned with the detection axis of said image detection sensor and generating a light beam that radially strikes the longitudinal axis of the article.

8. The measuring system of claim 1, wherein said image detection sensor is a linear camera.

9. The measuring system of claim 2, wherein said control and processing unit is configured in such a way to compensate the distortions of the images detected by said image detection sensor that are caused by the accelerations/decelerations of the conveyor device.

10. The measuring system of claim 2, further comprising speed detection means suitable for detecting the speed of the conveyor device; said control and processing unit being configured in such a way to receive the speed of the conveyor device from the speed detection means and adjust the image acquisition frequency of the image detection sensor.

11. Method for detecting geometrical and dimensional parameters of multi-segment rod-like articles, wherein each article has a longitudinal axis and comprises a front segment and a back segment of non-completely opaque material and two adjacent segments with different opacity, in such a way to generate an interface between the two adjacent segments, said method comprising the following steps:

a lighting step of said multi-segment rod-like article by means of a first lighting device that generates a light beam that strikes and crosses the front segment, wherein the lighting axis of the light beam of the first lighting device coincides with the longitudinal axis of the article, and a second lighting device that generates a light beam that strikes and crosses the back segment, wherein the lighting axis of the light beam of the second lighting device coincides with the longitudinal axis of the article, and a detection step of an image of the article along a detection axis that is orthogonal to said lighting axes.

12. The method of claim 11, comprising the following steps:

a feeding step, wherein at least one article is disposed in at least one housing of a conveyor device and is fed towards an image detection sensor;

an acquisition step, wherein a set of images of the article is detected by means of said image detection sensor;

an image reconstruction step, wherein a total image of the article is reconstructed by means of the set of images detected during the acquisition step;

a correction step, wherein the distortions of the total image are compensated, if any;

a processing step, wherein the total image is segmented and at least one interface is identified between at least two adjacent segments of the article;

a measuring step, wherein the dimensional and geometrical parameters of the article and of the segments of the article are calculated by means of said at least one interface identified during the processing step;

an evaluation step, wherein a conformity of the article is evaluated with respect to given specifications and a rejection signal is informed.

\* \* \* \* \*